April 26, 1966

J. R. LITTLE 3,247,585

APPARATUS FOR ASSEMBLING AND SECURING
COMPONENTS OF AN ELECTRIC ROTOR

Filed May 9, 1962

INVENTOR.
JOSEPH R. LITTLE
BY
John F. A. Earley
ATTORNEY.

INVENTOR.
JOSEPH R. LITTLE
BY John F. A. Earley
ATTORNEY.

United States Patent Office 3,247,585
Patented Apr. 26, 1966

3,247,585
APPARATUS FOR ASSEMBLING AND SECURING COMPONENTS OF AN ELECTRIC ROTOR
Joseph R. Little, Springfield, Pa., assignor, by mesne assignments, to Litton Industries Inc., Beverly Hills, Calif., a corporation of Delaware
Filed May 9, 1962, Ser. No. 193,477
2 Claims. (Cl. 29—205)

One of the problems in manufacturing synchros or the like is that of how to form the end windings or loops of the rotor winding into a compact shape so as to maintain clearance between the rotor and stator without impairing functional accuracy. Another problem is how to prevent the end windings, and the slip ring leads connected to the windings, from swinging outwardly when subjected to centrifugal force as the rotor is rotated at high speed.

In conventional rotors, the slip ring leads are brought from inside the slip rings through a hollow portion of the rotor shaft to emerge at the location of the rotor end windings. A protective boot is placed around the shaft and the slip ring leads, and then the winding is wound on the rotor to form slot windings and end (or loop) windings extending across both ends of the lamination stack. However, the end windings at the slip ring end of the stack are spaced away from the rotor shaft in order to admit a soldering iron with which to connect the end windings to the slip ring leads. Thus, the slip ring leads are concealed by the end windings, and are also prevented from swinging outwardly by centrifugal force when the rotor is being rotated at high speed. The end windings at the slip ring end are somewhat egg-shaped, while the end windings at the other end are more compact and have a more squared-off shape.

It is an object of this invention to provide an apparatus for making an electric motor.

It is another object of this invention to provide means for protecting the end windings of a rotor.

It is another object of this invention to eliminate the necessity of reaching down inside a quill with a soldering iron to make a connection with the slip ring leads.

It is another object to provide an apparatus for making a rotor wherein the end windings at both ends of the rotor are more symmetrical.

Other objects and advantages of this invention including its simplicity and economy, as well as the ease with which it may be adapted to existing equipment, will further become apparent hereinafter and in the drawings, in which.

Figure 1:
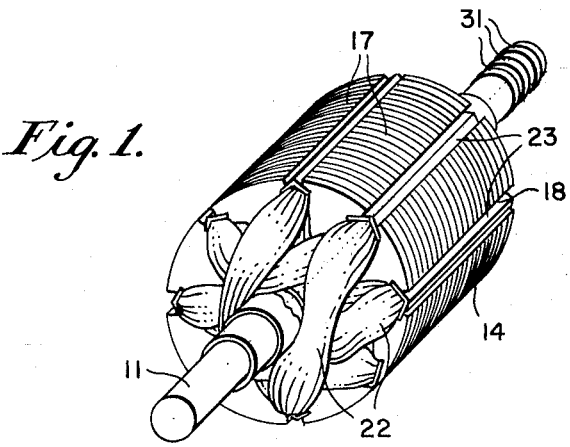
FIG. 1 is a view in perspective of an electric rotor including a stack of laminations mounted on a shaft and with a winding wound around its lamination stack.

Although specific terms are used in the following description for clarity, these terms are intended to refer only to the structure shown in the drawings and they are not intended to define or limit the scope of the invention.

Turning now to the specific embodiment of the invention selected for illustration in the drawings, there is shown an electric rotor having a rotor shaft 11 with a boss 12 at one end which has a shoulder in contact with end lamination 13 of a stack 14 of laminations which are mounted on shaft 11.

End lamination 15 at the other end of stack 14 has bearing against it a metal clamping sleeve 16 which holds the laminations tightly together.

The lamination stack 14 forms radial teeth 17 which are separated by slots 18. A wire winding is mounted on stack 14 with slot windings in the slots 18 and end windings 22 extending between slots 18 across the ends of stack 14.

Slot wedges 23 cover the peripheral slot openings and there is a layer of insulation between the slot windings and the teeth of the laminations.

The ends of stack 14 are provided with an insulating plastic film 24 and insulating washers 25 which prevent the end windings 22 from contacting the end laminations 13 and 15. An insulating sleeve 26 separates the end windings 22 from clamping sleeve 16, and at the other end of the stack, an insulating sleeve 27 separates the end windings 22 from boss 12.

Slip rings 31 are mounted at one end of shaft 11 and are provided with slip ring leads 32 which extend from slip rings 31 through a passage 33 in shaft 11 and emerge from shaft 11 near end lamination 13. Slip ring leads 32 are of generous length and are easily soldered or otherwise connected to end windings 22 and left on top of the end windings. However, if the rotor were to be used in this condition, the slip ring leads 32 would swing outwardly under centrifugal force when the rotor was rotating and the leads 32 would short out against the stator of the assembled synchro.

To avoid this, the end windings 22 and slip ring leads 32 are enclosed within a stainless steel end cap 34 which is cup shaped and is provided with a cup shaped insulating liner 35 which is preferably made of a polyester film insulating material.

The end windings 22, insulating liner 35, and end cap 34 are all bound together by an insulating binder which is preferably an epoxy resin.

The method of forming this electric rotor, which has a shaft 11 with slip rings 31 mounted thereon and slip ring leads 32 extending from rings 31 through passage 33 in shaft 11 to emerge at a location spaced away from slip rings 31 so as to be connected to the end windings 22, is as follows.

A stack 14 of laminations are mounted on shaft 11 to form radial teeth 17 separated by slots 18 and are held in position by the shoulder on boss 12 and by clamping sleeve 16.

Then the forming method comprises the steps of winding the wire on the rotor to form slot windings in slots 18 and end windings 22 between slots 18 across the ends of stack 14, connecting the slip ring leads 32 to end windings 22, taking a sheet of non-magnetic stainless steel and placing it in contact with a sheet of plastic insulating material, punching out and forming a stainless steel end cap 34 with an insulation liner 35 from said sheets, aligning end cap 34 and liner 35 relative to shaft 11 and stack 14, moving end cap 34 and liner 35 toward stack 14 to enclose the end windings 22 and slip ring leads 32, and binding together the windings, slip ring leads 32, insulation liner 35 and end cap 34 with an insulating material by pouring epoxy resin thereon and allowing it to seep therethrough and harden.

Figure 3:
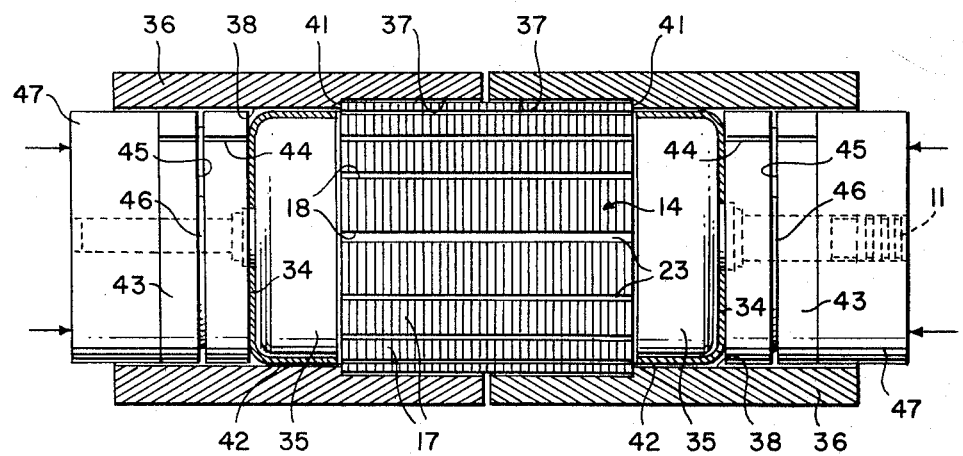
FIG. 3 is a view, partly in section, of the rotor forming apparatus of the invention.
Figure 2:
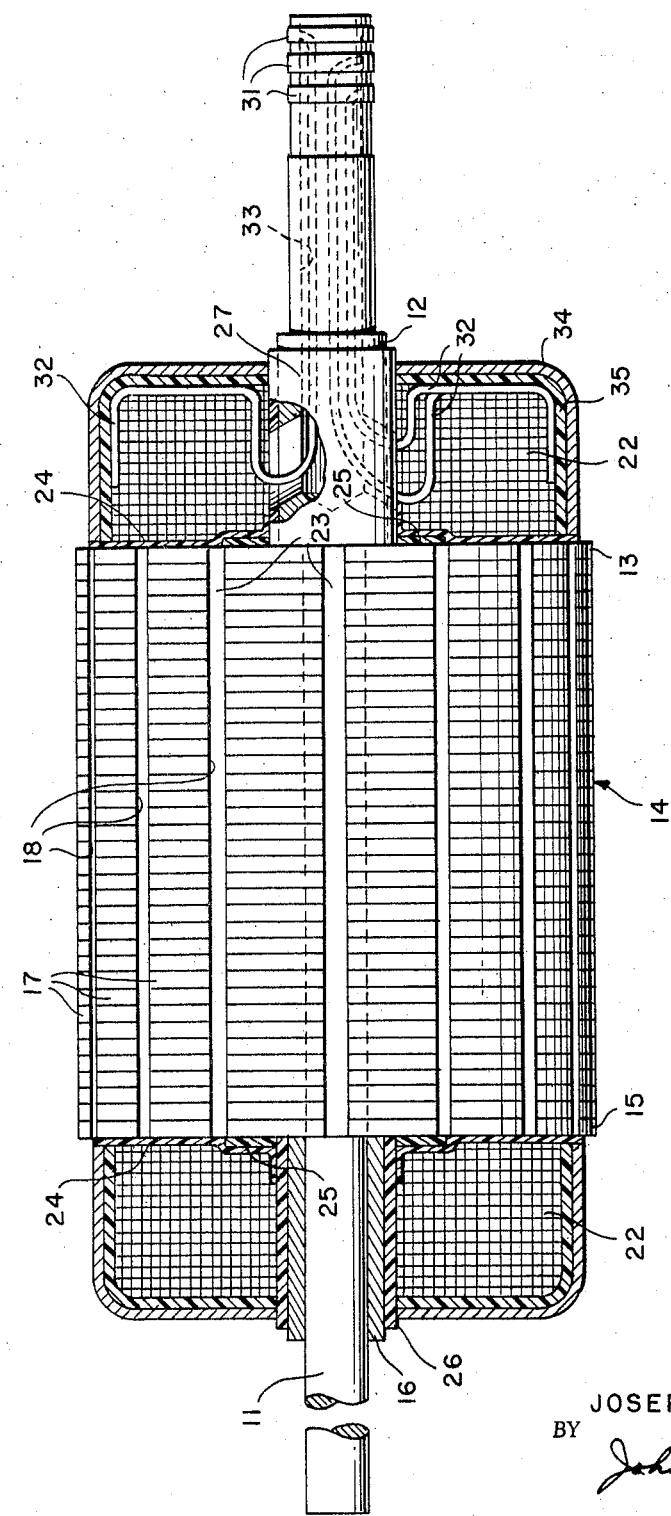
FIG. 2 is a view in side elevation and partly in section of an electric rotor constructed in accordance with this invention.

Apparatus for forming the rotor is shown in FIG. 3, and includes a pair of cylindrical outer members 36 which are used to line up end cap 34 with rotor stack 14. Outer members 36 have two inner diameters, a larger diameter 37 and a smaller diameter 38 with a shoulder 41 therebetween adapted to contact the end of the lamination stack 14. The larger diameter 37 fits around stack 14 and the smaller diameter 38 fits around the cylindrical surface 42 of end cap 34.

A pressure clamp 43, preferably made from a plastic material such as Teflon (or any material that epoxy resin does not stick to) contacts the end surface of each end cap 34 to hold it in the aligned position.

Pressure clamp 43 is shaped like a ring and has a bore of smaller diameter than the diameter of rotor shaft 11. A slit 44 is formed in the ring so that the clamp 43 is adapted to open to fit onto rotor shaft 11. A groove 45 is formed in the outer cylindrical surface of the ring of pressure clamp 43 and a spring 46 is seated in groove 45 to urge the ring to clamp around rotor shaft 11.

Plungers 47 contact the outer ends of each clamp 43 and are pressed toward each other to properly form the end windings 22 of the rotor and enclose the end windings 22 within end caps 34 and insulating liners 35.

After the elements of the rotor are properly positioned by the rotor-forming apparatus, the outer members 36 and plungers 47 are stripped from the rotor leaving the pressure clamps 43 to hold the end caps in position. The rotor is heated to about 150° C. and then flooded with warm epoxy resin. Impregnation takes place as the hot rotor absorbs the epoxy resin through capillary action. The impregnated unit is then placed in an oven to cure the resin.

After the epoxy resin cures, the pressure clamps 43 are stripped from the rotor, and there is left the completed rotor unit, including end caps 34 which had served in the assembly procedure as a forming tool to properly shape and form the end windings 22. The elements of the completed rotor are kept together by the epoxy resin which under heat had become less viscous and seeped everywhere: into and through the windings, between the windings 22 and insulating liner 35, and between insulating liner 35 and stainless steel end cap 34.

If end cap 34 were used without insulating liner 35, it might scratch the insulation film on windings 22 and cause a short between windings 22 and end cap 34.

In the conventional rotor which utilized the boot to provide a space for the slip ring leads inside the end winding 22, the connection between the end windings and the slip ring leads was made with a soldering iron that was inserted inside the winding in the space made by the boot. This was a difficult operation, but it buried the slip ring leads so that they could not whip outwardly under centrifugal force when the rotor was rotating, and so that they were concealed from view. With the present invention, the slip ring leads can be long and can be left on top of windings 22. They are not unsightly because they are covered up by the end caps 34.

End caps 34 simplify the rotor manufacturing operations because they eliminate the difficult step of soldering the slip ring leads to the end windings in the space made by the boot down inside the winding.

After the rotor has been impregnated with epoxy resin, the rotor has to be cleaned and the slip rings have to be machined. In conventional rotors which have no end caps, the operator must be very careful not to damage the end windings 22, since any knicking of the end windings would make the rotor useless. In the present invention, the metal caps 34 prevent any damage to the end windings 22 during the cleaning operation.

After the rotor has been cleaned, the next operation is the "build" operation, the operation whereby the rotor is mounted in the outer casing of the synchro. In the conventional "build" operation, the operator would sometimes bump an unprotected end winding against the interior of the casing, and knick the winding. Also, the unprotected end winding might be damaged when the operator mounted the end plate onto the synchro outer casing. These chances of nicking wires, and thereby making the rotor useless, are eliminated because of the protection afforded by the metal end caps 34.

It is to be noted that end caps 34 act as a forming tool and also as an integral part of the rotor. End caps 34 mechanically hold the end windings 22 in place until the coil impregnant (preferably epoxy resin) cures. The end caps 34 become an integral part of the rotor.

It is to be understood that the form of the invention herein shown and described is to be taken as a preferred embodiment. Various changes may be made in the shape, size and arrangement of parts, and equivalent elements may be substituted for those illustrated and described herein. For example, any impregnant material having electrical insulating properties (such as varnish) could be substituted for the epoxy resin described herein. Moreover, parts may be reversed, and certain features of the invention may be utilized independently of the use of other features, all without departing from the spirit or scope of the invention as defined in the subjoined claims.

The claimed invention:

1. Rotor forming apparatus comprising a pair of outer members for lining up an end cap with the lamination stack of a rotor, said outer members having a bore of two diameters with a shoulder therebetween adapted to contact end of the lamination stack with the larger diameter fitting around said stack and the smaller diameter fitting around the cylindrical surface of a rotor end cap, means for clamping around said shaft and holding an end cap in position next to the end windings of the rotor, and plungers which fit within said outer members and contact the outer ends of said clamping means and are pressed toward each other to properly form the end windings and enclose them within the end caps.

2. Rotor forming apparatus comprising a pair of cylindrical outer members for lining up an end cap with a rotor stack of laminations, said outer members having two inner diameters with a shoulder therebetween adapted to contact the end of the lamination stack with the larger diameter fitting around said stack and the smaller diameter fitting around the cylindrical surface of a rotor end cap, a pressure clamp made of a material to which epoxy resin does not adhere and which is adapted to contact the end of each end cap, each clamp being shaped like a ring with a bore of smaller diameter than the rotor shaft and having a slit in the ring so as to be adapted to open to fit onto the rotor shaft and with a groove in the outer cylindrical surface of said ring, a spring seated in said groove to urge the ring to clamp about the rotor shaft, and plungers which contact the outer ends of each clamp and press them toward each other to properly form the end windings of the rotor and enclose said end windings within the end caps.

References Cited by the Examiner

UNITED STATES PATENTS

| | | | |
|---|---|---|---|
| 2,125,970 | 8/1938 | Waters | 29—155.53 |
| 2,226,398 | 12/1940 | Cristiano et al. | 29—205 |
| 2,427,282 | 9/1947 | Hoover | 310—270 XR |
| 2,483,024 | 9/1949 | Roters | 29—155.53 |
| 2,673,391 | 3/1954 | Goodwin | 29—205 |
| 2,683,233 | 7/1954 | Ruhl | 310—270 |
| 2,716,803 | 9/1955 | Shaw | 29—205 |
| 2,831,991 | 4/1958 | Perkins | 310—43 |
| 2,989,657 | 6/1961 | Sampson | 310—270 |
| 3,014,146 | 12/1961 | Andres | 310—270 |
| 3,139,921 | 7/1964 | Roberts | 29—205 |

WHITMORE A. WILTZ, *Primary Examiner.*

THOMAS H. EAGER, MILTON O. HIRSHFIELD,
*Examiners.*